United States Patent [19]
Mack

[11] 3,840,791
[45] Oct. 8, 1974

[54] ALLEVIATION OF DELAYS AND INACCURACIES IN MACHINING BY THE CONSTANT SURFACE FEET PER MINUTE MODE

[75] Inventor: William H. Mack, North Fond du Lac, Wis.

[73] Assignee: Giddings & Lewis Inc., Fond du Lac, Wis.

[22] Filed: Feb. 26, 1973

[21] Appl. No.: 336,055

[52] U.S. Cl............... 318/571, 318/39, 235/151.11
[51] Int. Cl............................................. G06f 15/46
[58] Field of Search............ 340/172.5; 235/151.11; 318/571, 573, 574, 39

[56] References Cited
UNITED STATES PATENTS
| | | | |
|---|---|---|---|
| 3,518,513 | 6/1970 | Pomella et al. | 318/571 |
| 3,617,715 | 11/1971 | Dummermuth | 235/151.11 |
| 3,727,191 | 4/1973 | McGee | 340/172.5 |

*Primary Examiner*—Gareth D. Shaw
*Assistant Examiner*—John P. Vandenburg
*Attorney, Agent, or Firm*—Wolfe, Hubbard, Leydig, Voit & Osann, Ltd.

[57] ABSTRACT

Methods and apparatus for causing a turning machine tool to operate with selectable but "constant surface feet per minute" (CSFM) under the control of an iteratively computing numerical control director, and characterized by anticipation of the necessary spindle or table r.p.m. which will be required at the start of a cut, such that as the cutter is rapidly approaching a workpiece, the spindle or table is accelerated to that required speed, thereby to substantially eliminate the delay which would be necessary to wait for the required speed to be reached with spindle or table servo motors of limited power driving loads with high inertia. The invention is specifically embodied in methods and apparatus for substituting (in lieu of signals representing the actual radius of the cutter from the workpiece center) signals representing the radial distance from the work center which the cutter will reach at the end of a rapid traverse positioning motion—and while that positioning motion is being executed—in the steps and apparatus by which the table or spindle speed is made inversely proportional to a signaled radius value.

9 Claims, 10 Drawing Figures

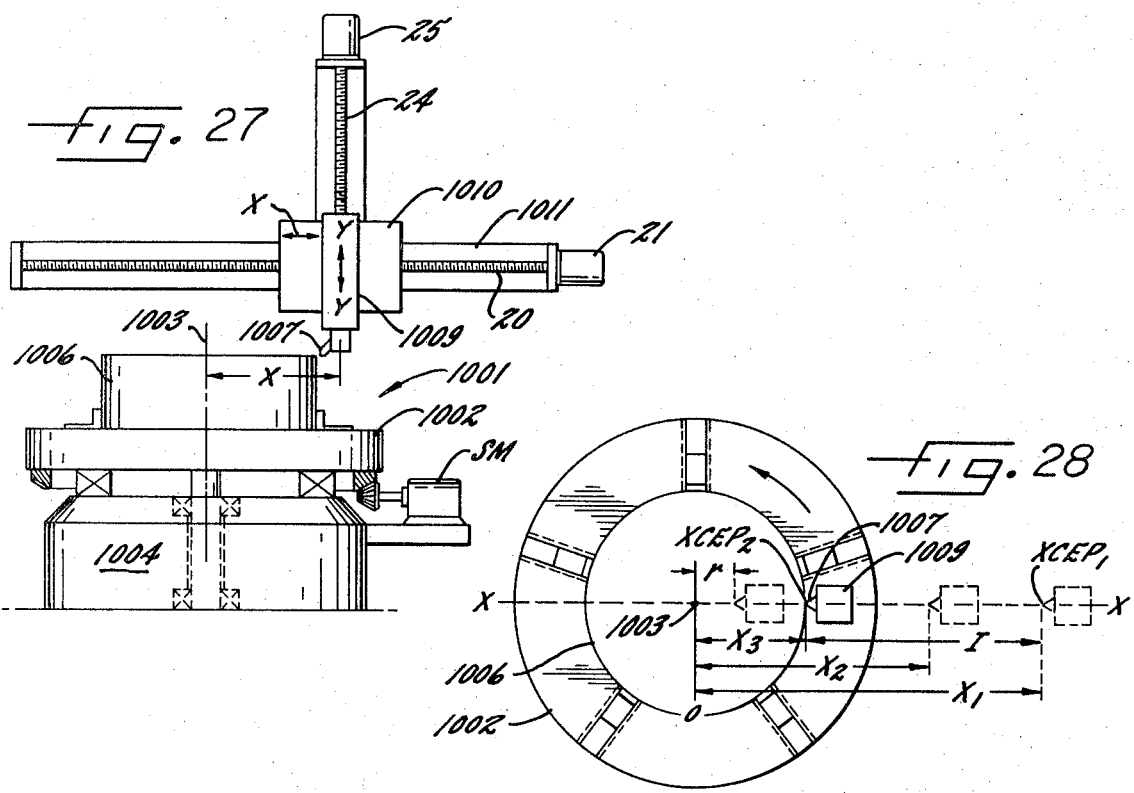
Fig. 27
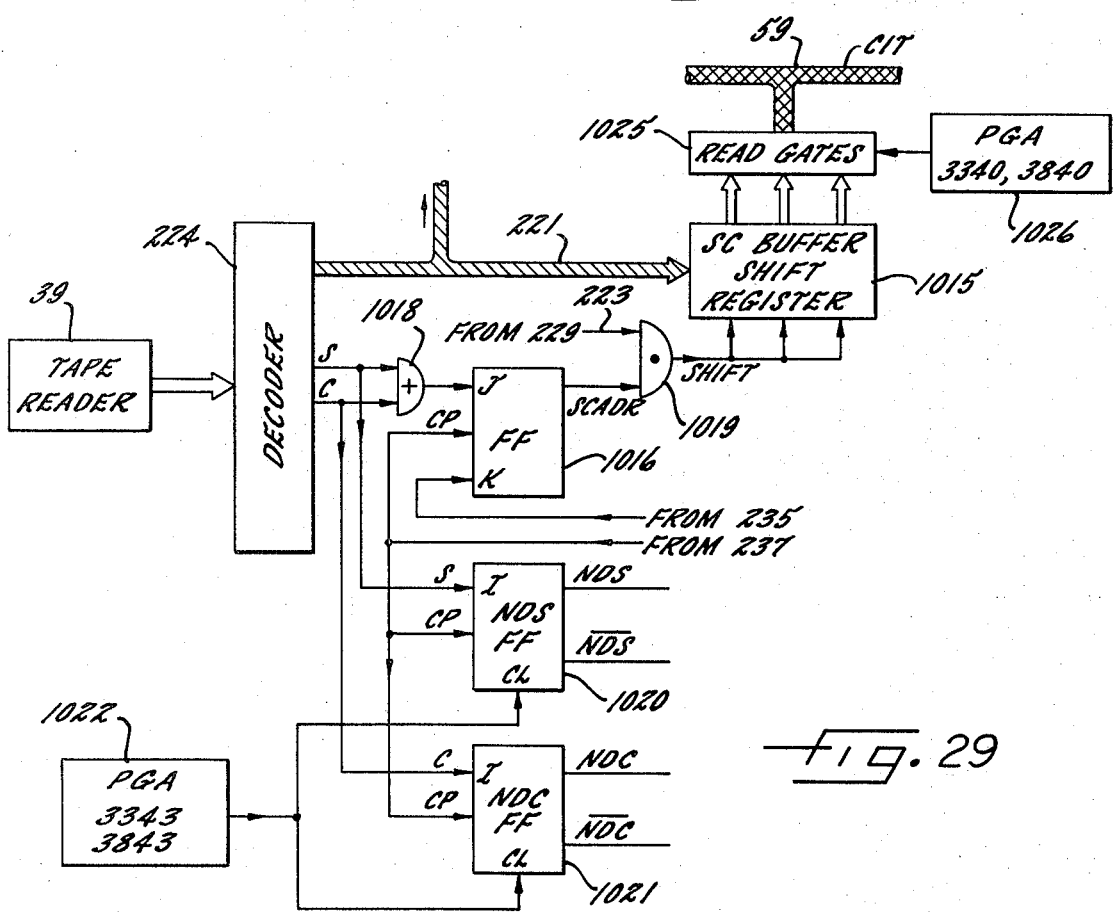
Fig. 28
Fig. 29

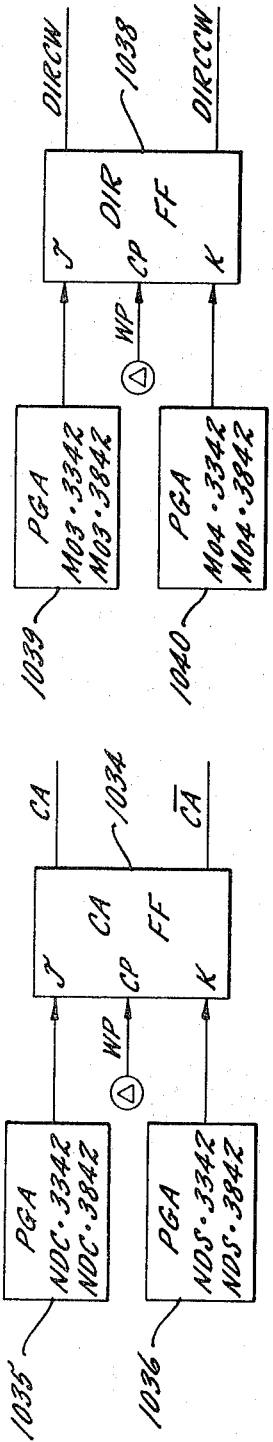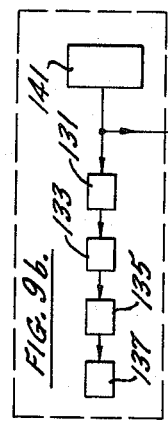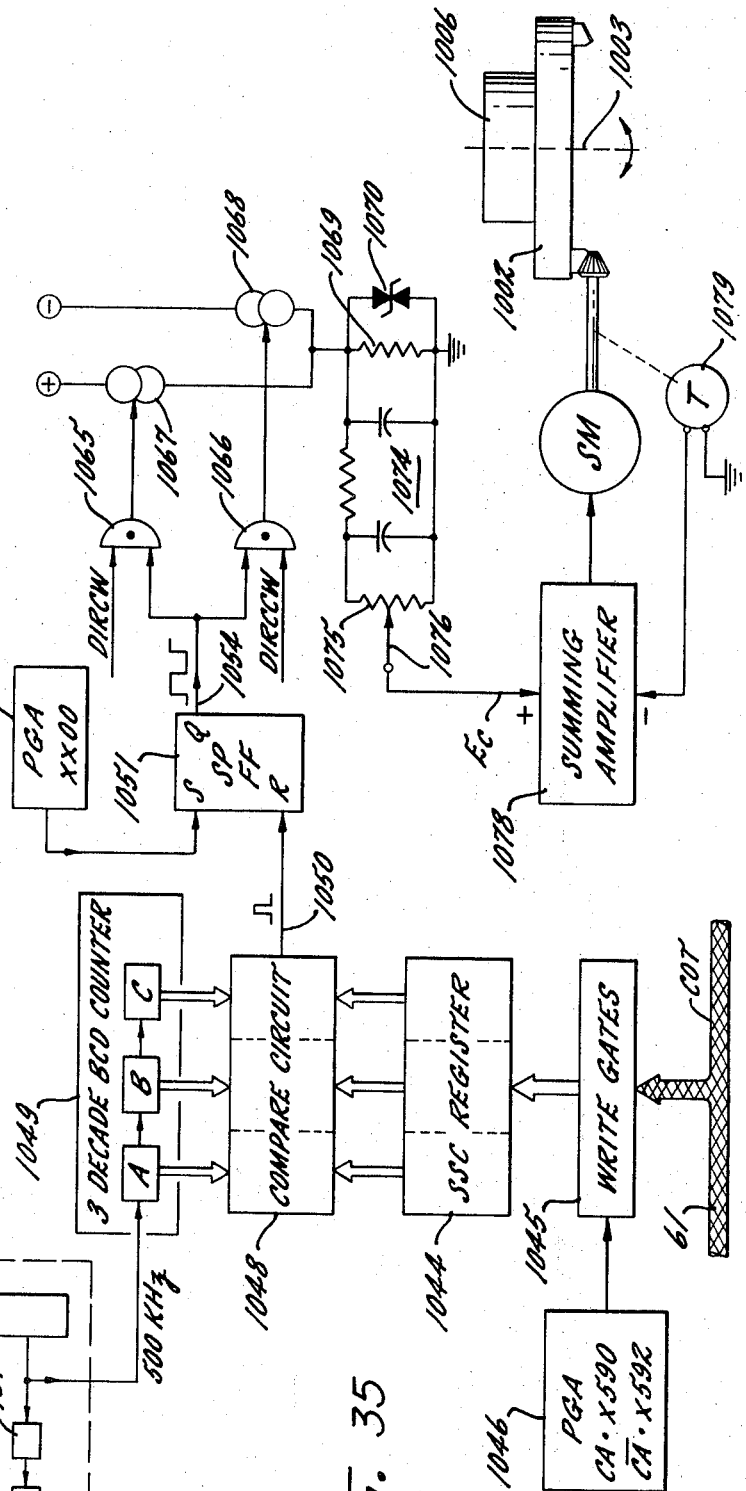

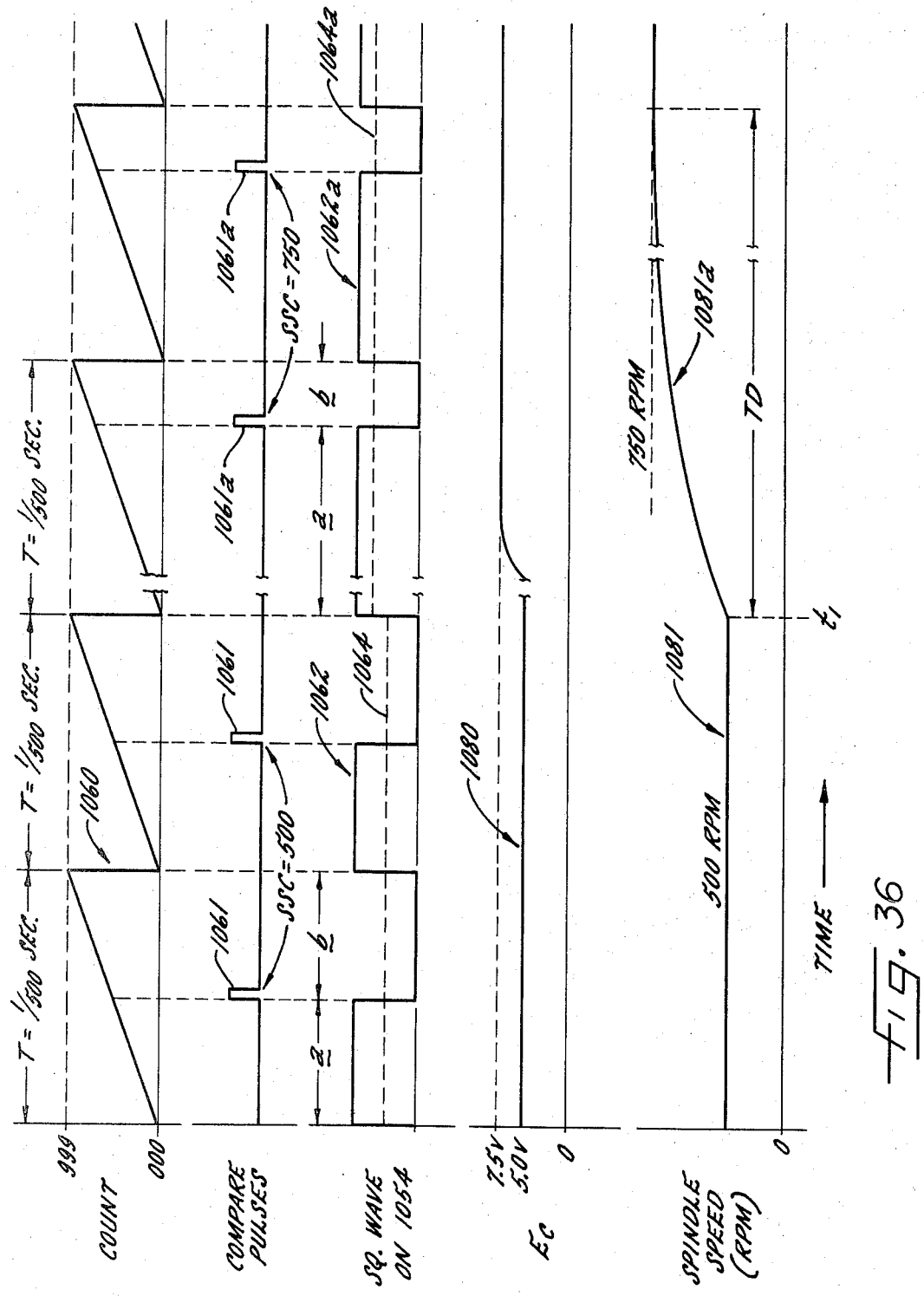

ALLEVIATION OF DELAYS AND INACCURACIES IN MACHINING BY THE CONSTANT SURFACE FEET PER MINUTE MODE

CROSS REFERENCE TO RELATED APPLICATION

Although no benefit of its earlier filing date is here asserted because of any continuation or continuing relationship, cross reference is made to copending U.S. application Ser. No. 124,356, filed Mar. 15, 1971 (now U.S. Pat. 3,727,191 issued Apr. 10, 1973) in the name of John K. McGee and assigned to the assignee of the present application. That copending application has been allowed and the issue fee therefor paid prior to the date of the present application. The said patent will herein be referred to as Case A; and as noted below, at least portions of its disclosure will be incorporated by reference herein both to provide general background information and essential subject matter in the present application, thereby permitting the present specification to be much more brief than otherwise would be possible.

BACKGROUND OF THE INVENTION

1. Field of the Invention

The present invention relates in general to the controlling of machine tools, and more particularly to methods and apparatus for effecting machining operations (e.g., metal or wood cutting) in the CSFM mode. In its preferred form, the invention is embodied in and practiced by a machine tool controlled by a numerical control director of the iteratively computing type such as that generally illustrated and described in Case A.

2. Summary of the Invention

It is the general aim of the invention to "anticipate" the initiation of actual cutting operations in the CSFM mode by a turning machine tool, and thereby to eliminate delays and inaccuracies which might otherwise be incurred in getting a heavy table or spindle up or down to the necessary rotational speed before actual cutting begins at a preselected constant surface feet per minute. Stated in another way, it is an object to overcome the delays which might be incurred between the instant that a cutter reaches a position ready to start a CSFM mode cut and the instant that a table or spindle reaches the required rotational speed, such delays arising because of the high inertia load and the limited torque or acceleration capability of the driving motor.

Another object of the invention is to achieve such reduction in delays, or the elimination of surface finish inaccuracies, in CSFM operations, by methods and apparatus which are extremely simple and which can be reliably implemented at very little cost.

It is still another object to provide such advantages in a numerical control system of the iteratively computing type associated with a turning machine, the system having the capability of operating in a CSFM mode, and the "anticipation" of the spindle or table speed being realized by the addition of only a few components.

These and other advantageous aspects of the invention will become apparent as the following description proceeds, taken with the drawings briefly described below.

BRIEF DESCRIPTION OF THE DRAWINGS

The drawing FIGS. 1 through 26 of Case A, and the brief description of such drawings which appears in Case A, are hereby incorporated by reference. To permit ready differentiation between the drawing figures of Case A and those figures which accompany the present application, the latter figures are designated by numerals from 27 upward, and more specifically:

FIG. 27 is a diagrammatic and fragmentary front elevational view of an exemplary turning machine, here a vertical lathe;

FIG. 28 is a diagrammatic and fragmentary plan view of the table, workpiece and cutter in the vertical lathe;

FIG. 29 is a block diagram illustrating certain modifications and additions to the control components shown in FIG. 9m;

FIGS. 33 and 34 are block diagram representations of two respective flip-flops and their associated PGA's, which are added to the various control flip-flops which are shown in FIGS. 9n and 9o;

FIG. 35 is a representation (partially in block form and partially in schematic circuit form) of a spindle or table driving means and the control elements associated therewith for causing the spindle or table to have a numerically commanded rotational speed or r.p.m.; and FIG. 36 is a series of graphs plotted against time to illustrate exemplary changes in certain variables during the operation of the control system here disclosed.

Figure 30:
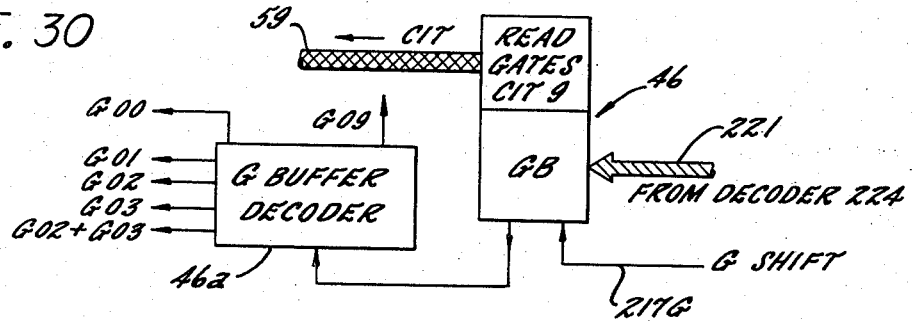
FIG. 30 is a fragmentary block diagram showing a portion of the elements illustrated in FIG. 9l, but with certain additions or changes.

For ready and convenient reference, there are included, as the last pages of the present invention, Tables IA, IIA and IVA to which several references will be made herein. These tables are supplements to Tables I, II and IV, respectively, and are to be read in conjunction with the latter.

DESCRIPTION OF PREFERRED EMBODIMENT

Specification pages 1 through 189 of Case A are hereby incorporated by reference into and made a part of the present specification. It will be assumed from this point forward that the reader is familiar with the description, symbols and figure numbers of Case A, and these will be used herein and supplemented with additional symbols and figure letters associated especially with the present application.

The machine tool shown in FIG. 1 is a three-axis milling machine which is controlled in its relative motions between a cutter and a workpiece by a numerical control director. For the sake of brevity, that director has been disclosed as having two axes (X and Y) of control, but by straightforward duplication of certain components and timing arrangements, that numerical control director may readily be expanded to control three or more axes. The present invention relates specifically to the control of turning machines, however, and by way of introduction a vertical lathe 1001 has been diagrammatically illustrated in FIGS. 27 and 28. In brief terms, the lathe includes a rotatable work support such as a table 1002 journaled for rotation about a vertical axis 1003 relative to a supporting base 1004 and rotationally driven at variable and controlled speeds by a motor SM. Because horizontal lathes for work-chucking spindles, and various other types of turning machines may be used advantageously with the present invention, the table 1002 will be interchangeably called either a table or a spindle, and the latter term is to be taken as generic to either.

The table or spindle 1002 in FIGS. 27 and 28 supports a workpiece 1006 clamped thereon and thus positioned to be acted upon by a cutter 1007 which, merely as an example, is movable along two axes X and Y respectively lying radially to and parallel with the rotational axis 1003. The cutter is carried at the lower end of a ram 1009 (and may, if desired, be disposed upon an indexable turret, not shown, carried by the ram) which is vertically slidable within ways formed on a saddle 1010. The ram is vertically movable or positionable along the Y axis at different velocities to reach different positions by the controlled energization of a Y axis servo motor 25 coupled to a lead screw 24 engaged with a nut (not shown) fixed in the ram. The saddle 1010, on the other hand, is horizontally slidable along the ways of a cross rail 1011 at different speeds and to different positions by the controlled energization of an X axis servo motor 21 coupled to a lead screw 20 engaged with a nut (not shown) fixed in the saddle. Thus, by controlling the energization of the servo motors 25 and 21, the cutter 1007 may be moved to different coordinate positions in the X, Y plane and along different desired linear or circular path segments at desired path velocities or feed rates — and by the straightforward use of the previously described iteratively computing director. Although in the machine tool industry the vertical axis of motion in a lathe is commonly designated a Z axis, the vertical axis in the present instance has been designated as a Y axis so that all of the foregoing description of X and Y axis control will be applicable to the lathe 1001 and its respective servo motors 21 and 25.

It is a well known and desirable technique to operate a turning machine such that the cutter bites through the workpiece at a selectable but constant cutting speed, i.e., constant surface feet per minute. This permits efficient machining in approximately the shortest time while avoiding excessive heating or other damage to the cutter as a facing or tapering cut is made with the cutter moving along a path which has at least one component (here, along the X axis) lying normal or radial to the spindle and workpiece axis of rotation. Generally stated, to keep the surface feet per minute constant, the spindle speed must be varied so that it changes in inverse proportion to the radial position of the cutter as the latter moves.

Considering the cutter disposed at the radial distance $r$ inches from the axis 1003 as shown in FIG. 28, and assuming that the table 1002 is turning at W revolutions per minute, the circumference of the cutting circle is $2\pi r$ inches (i.e., $2\pi r/12$ feet), and the cutter will travel relative to the workpiece through that circumferential distance during a time period equal to $1/W$ minutes. The surface feet per minute velocity of the cutting action will thus be $$SFM = 2\pi/12 \; r \div 1/W = \pi/6 \; r \cdot W \quad (1)$$

If it is desired to keep SFM constant at some selected value, the r.p.m. of the lathe must be varied such that at all times $$r.p.m. = W = SFM \; 6/\pi r = 1.91 \; SFM/r \quad (2)$$

This means that as the cutter 1007 moves radially inward toward the table axis 1003, and the value $r$ of the cutter's radial position decreases, then the table speed W must vary inversely with $r$ and thus increase in order to keep the SFM value constant. As will be noted below, the numerical control director here disclosed will perform the "CSFM" mode of operation when placed in a "C" mode, the letter "C" being a short designation for CSFM.

In order to understand the director's operation in this mode, it should first be noted that any block on the punched tape 37 (FIG. 4) may contain either an S word (designating a programmed table speed in r.p.m.), or a C word (designating a programmed constant cutting speed, or CSFM, in feet per minute). For example, if the word S123 appears in any block, it calls for the table to be run at 123 r.p.m. until a new S or C word is read from a later block; and if the word C750 appears in any block, it designates that the cutting speed is to be maintained at 750 feet per minute until a new S or C word is read from a latter block.

To accept and respond to the reading of an S or C code and the numerical value associated therewith, the circuits associated with the program tape reader 39 in FIG. 9m are supplemented to include the additional components shown in FIG. 29. That is, an SC buffer shift register 1015 is provided and coupled to the number-signaling multi-conductor bus 221 leading from the decoder 224. Entry and shifting of numerical values successively signaled on the bus 221 is permitted only when an address flip-flop 1016 is set to produce an SCADR signal. That flip-flop is set by the output of an OR circuit 1018 connected to the S and C character output lines of the decoder 224, so that the reading of either S or a C code will enable the following numerical digits (each signaled in BCD notation on the bus 221) to be shifted into the SC buffer register. In a fashion similar to the control of the other buffer shift registers described in connection with FIGS. 9l and 9m, the presence of the SCADR signal enables an AND gate 1019 which permits timing pulses transmitted over conductor 223 from gate 229 to cause acceptance and shifting of successively signaled numerical digits into the SC register. The SC number signaled at the output of this register thus represents the value of the last-read S or C word. The flip-flop 1016 is cleared by a signal from OR circuit 235 when the next address letter is signaled by the decoder 224, and thus the number held in the SC register 1015 will not be changed until a new S or C word is read and signaled by the tape reader 39.

In order to designate whether the table speed command number in the SC register is an S word or a C word, two flip-flops 1020 and 1021 are employed to respectively produce NDS or NDC ("new data S" or "new data 29") signals. As shown in FIG. C, the flip-flop 1020 is set to produce the NDS signal when an S address character is signaled by the decoder 224; and the flip-flop 1021 is similarly connected to be set when an address character C is signaled. Both flip-flops are cleared by a signal from a PGA 1022 when the system is in transfer Mode 3 and thus just prior to the next starting of the tape reader and the reading of the next block of program information. The use of the signals NDS and NDC will be explained below.

In the preferred embodiment of the present invention, any block of program tape (FIG. 4) may contain any one of mode codes G01, G02, G03 (as before described) or G00. The G00 code designates that the system is to be operated in a "positioning mode" without any special regard to the precise path segment which the cutter follows in traveling from its previous coordinate position P1 to its next coordinate position P2 (see FIG. 2 for clarity). Moreover, in the G00 mode, the cutter will be moved at a rapid traverse velocity to minimize elapsed time, since the G00 mode is called for by the programmer to produce positioning motions when the cutter is free of contact with the workpiece. The traverse velocity (unlike the path feed rate programmed as an F word for contouring modes G01, G02 or G03) need not be numerically designated on the program tape, and the director will (as explained below) cause the path velocity to have a value which makes the cutter move along the "longest" or "fastest" axis component at the maximum axis velocity of which the driving servo motor is capable. To accommodate the reading of a G00 positioning and traverse mode code, FIG. 9l is modified to the extent shown in FIG. 30. This involves simply the recognition that any block of command data on the program punched tape may include a G00 code which will be transferred into the G buffer register 46 as previously described. FIG. 30 merely indicates by the G00 line extending from the decoder 46a that a G00 signal may appear following the reading of any block of data containing a G00 code, and in lieu of the mode codes G01, G02 or G03.

Figure 31:
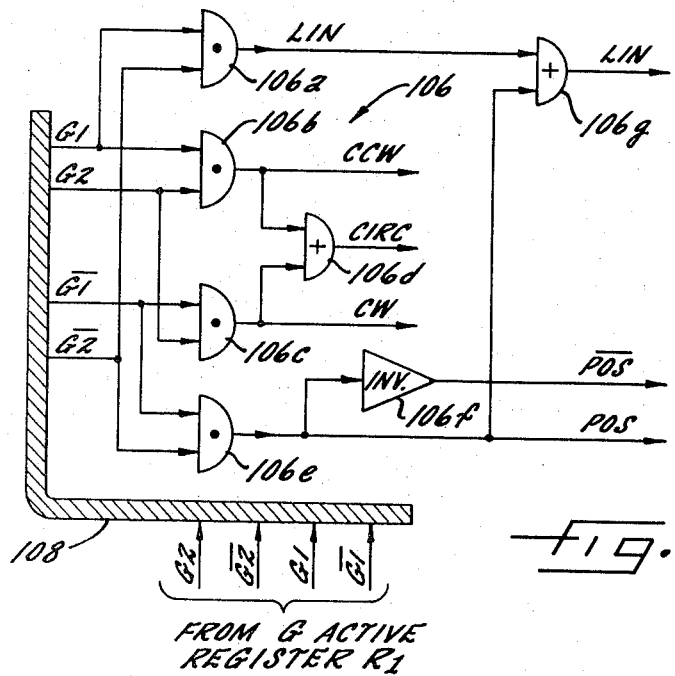
FIG. 31 is a fragmentary block diagram corresponding to a portion of FIG. 9f and illustrating certain changes or additions to the corresponding elements shown in FIG. 9f.

FIG. 31 illustrates a modification or supplement to FIG. 9f, namely, the addition of an AND gate 106e whose inputs are the $\overline{G1}$ and $\overline{G2}$ lines from the G active register R1 which has been previously described. If a block of data transferred to the active registers contains a G00 code, the $\overline{G1}$ and $\overline{G2}$ signals will both be a 1 level, and therefore the output POS from the gate 106e will reside at a 1 level with the output $\overline{POS}$ of an associated inverter 106f being 0. Thus, when a block of data in active storage is to be executed in the positioning/traverse mode (rather than in one of the contouring modes LIN, CW or CCW), the signal POS will be 1 and the signals CW, CCW, CIRC and $\overline{POS}$ will all be 0. The POS signal resulting from a G00 code will also supply an input to an OR circuit 106g, so that the LIN signal will exist and the system will operate by linear interpolation during positioning at a rapid traverse rate.

Figure 32:
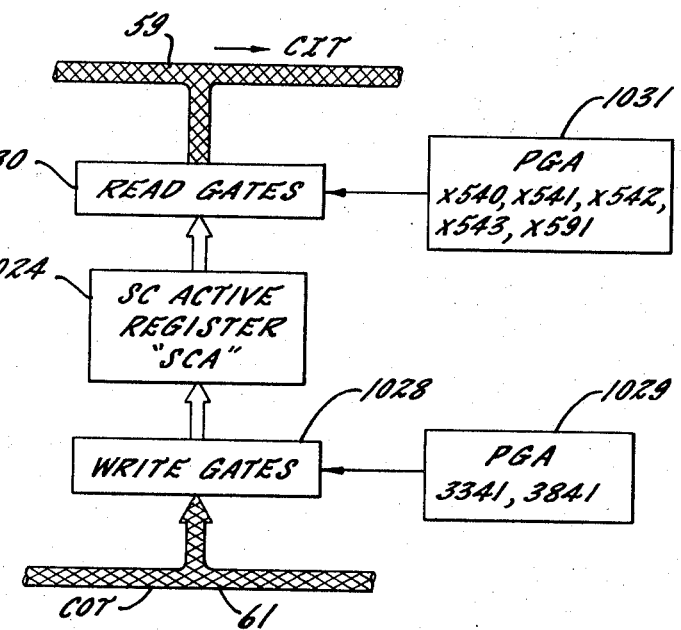
FIG. 32 is a fragmentary block diagram illustrating an active register which is added to the several active registers shown in the drawings of Case A.

FIG. 32 may be taken as a supplement to FIG. 8i, and merely illustrates the fact that an active storage register 1024 is provided to receive and hold the number originally placed in the SC buffer when a block of data is transferred from buffer storage to active storage. Thus, the number signaled by the register 1024 may be designated by the symbol SCA to indicate that it represents the active value of a number designating either a programmed spindle speed in r.p.m. (resulting from the previous reading of an S word) or a programmed constant cutting speed (resulting from the previous reading of a C word). During the Mode 3 transfer operations represented in Table IV (as supplemented by Table IVA) the number SC from the buffer register 1015 is transferred through READ gates 1025 (FIG. 29) controlled by a PGA 1026 onto the computer input trunk 59 and into the cleared Answer Register. Thereafter, that same number which appears on the computer output trunk COT is transferred through WRITE gates 1028 controlled by a PGA 1029 into the SCA register 1024. For subsequent computations and control purposes, the SCA number may be transmitted through READ gates 1030 controlled by a PGA 1031 onto the computer input trunk CIT, as hereinafter explained.

The signals NDC and NDS discussed above with reference to FIG. 29 are employed to control the enabling and the clearing of a CA flip-flop 1034 (FIG. 33) which produces complemental output signals CA and $\overline{CA}$ designating whether the system is operating in the CSFM mode or the direct r.p.m. control mode. It will be seen that the setting of the flip-flop 1034 is accomplished by a PGA 1035 which can act only during Mode 3 transfer operations if the NDC signal exists; and likewise, the clearing of the flip-flop 1034 is accomplished by a PGA 1036 which is effective only during the Mode 3 transfer operations if the signal NDS exists. Therefore, when a block of data is transferred from buffer to active storage, the flip-flop 1034 will be enabled to produce the CA signal if the number transferred into the SCA register 1024 designates a programmed constant cutting speed, and conversely, the signal $\overline{CA}$ will exist if the number in the SCA register represents a commanded spindle speed in r.p.m. Briefly summarized, presence of the signal CA simply means the active block of command data is to be executed in the CSFM mode.

The spindle or table driving motor SM (FIG. 27) is bidirectional, and may be operated to drive the table 1002 and the workpiece 1006 in either a clockwise or counterclockwise direction. For programming purposes, the insertion of an M03 or M04 code in any block of the program tape designates that the spindle is to be driven in a clockwise or counterclockwise direction. When such an M03 or M04 code is read from the punched tape by the reader 39 (FIG. 9m) it will be transferred into the M buffer register 48 (FIG. 9o) and the associated M decoder will thereby signal a binary 1 level on its M03 or M04 output line. When that block of data read into buffer storage is subsequently transferred to the active storage registers, a DIR flip-flop 1038 (FIG. 34) is set or reset in order to produce signals DIRCW or DIRCCW respectively designating that the table is to be driven in a counterclockwise or clockwise direction. As will be seen from FIG. 34, a PGA 1039 controls the setting of the flip-flop 1038 during Mode 3 transfer operations only if the M03 mode signal then exists, and a PGA 1040 clears the flip-flop if an M04 signal exists. The auxiliary code signals M03 and M04 are mutually exclusive, and the reading of one removes the other. Thus, if an M03 or an M04 code is read from any given block of the punched tape, the flip-flop 1038 will be set to the corresponding state when that block of data is transferred to active storage, and that flip-flop will remain in that state until a different one of the M03, M04 codes is subsequently read from the punched tape.

The circuitry for actually controlling the direction and speed of the table 1002 is shown in FIG. 35. It includes a storage register 1044 to hold a changeable, digitally signaled number SSC (which stands for "speed servo command"). Periodically, and by way of example, once during each 1/50 second interval, the number SSC is updated, i.e., changed to a value which may be equal to or different from its previous value. This updating is accomplished by transferring through WRITE gates 1045 a number present on the computer output trunk COT at instants determined by an associated PGA 1046.

Briefly stated, the number signaled in BCD notation on the output lines of the SSC register 1044 can have any value between 000 and 999, —and in the specific example here given, it represents a commanded spindle speed of 000 to 999 r.p.m. Those output lines are connected to one set of inputs for a three decade compare circuit 1048, whose other set of inputs connect to the outputs of a three decade BCD counter 1049. The counter is continuously supplied with pulses from a suitable constant frequency source so that it repeatedly "sweeps" through successive count cycles from count state 000 through count state 999. As here shown, a 500 KHz. squarewave from the output of the divide-by-four circuit 141 in the timing signal generator of FIG. 9b is connected directly to the input of the counter 1049 so that each cycle or count sweep of the latter occupies 1/500 second and there are 500 counting sweeps per second.

The compare circuit 1048 is conventionally organized in a manner known to those skilled in the art (and like the compare circuit 399 in FIG. 9d) such that its output line 1050 receives a binary 1 voltage whenever the two signaled input numbers are equal. Since the number SSC resides between 000 and 999, and because the counter number repeatedly sweeps from 000 to 999, there will be one count state (lasting for two microseconds) of the counter during each sweep when the output line 1050 resides at a 1 voltage level. Thus, these "compare pulses" on the output line 1050 occur at a frequency of 500 per second, but the timing or phasing of each compare pulse relative to the counter sweep will vary depending upon the number SSC.

The compare pulses are applied to the resetting terminal of an SP flip-flop 1051, the latter being set 500 times per second by the output of a PGA 1052 wired to produce a signal at the beginning of every "time column" measured off by the program step generator in FIG. 9b. That is, with reference to Table IA the PGA 1052 produces a pulse to enable or set the SP flip-flop 1051 on each time step xx00, i.e., at the beginning of every time column of Table IA. Since each column is made up of one hundred time steps of twenty microseconds each, the flip-flop is regularly set at recurring instants spaced 2,000 microseconds (i.e., two milliseconds or 1/500 second) apart. Initial clear circuits (not shown, but per se well known in the art) serve to set the counter 1049 and the decades 131, 133, 135, 137 in FIG. 9b to their zero count states when power is first applied to the entire director, thereby to assure that the counter is in its 000 count state when the time step generator of FIG. 9b is signaling x00 at the beginning of each time column.

In consequence, the flip-flop is set at the beginning of each 1/500 second interval when the number or count state of the counter 1049 is 000; and it is reset at an instant which is later by a time span or phase proportional to the then-existing value of the number SSC. Thus, it may be said that the Q output on line 1054 from the flip-flop 1051 is a recurring squarewave having a constant period of 1/500 second, but a duty cycle which varies in proportion to changes in the value of the number SSC.

The foregoing may be more easily understood by reference to FIG. 36 wherein the curve 1060 is a graphical representation of the changing count state signaled on the output terminals of the counter 1049. As shown, during successive equal periods T of 1/500 second, the count state rises linearly from a starting value of 000 to a final value of 999, and then begins over. Thus, the sweep cycles of the counter 1049 are represented by the successive sawteeth in the curve 1060.

If it is assumed initially that the number SSC signaled by the register 1044 is 500, then compare pulses 1061 will be produced on the output line 1050 at those instants in time when the number signaled by the counter 1049 is 500. As shown in FIG. 36, these compare pulses 1061 thus appear midway through each count sweep.

Curve 1062 in FIG. 36 represents the recurring squarewave produced on the putput line 1054 of the SP flip-flop 1051. As shown, the PGA sets the flip-flop and causes the squarewave to have a relatively high or binary 1 value at the beginning of each count sweep, i.e., when the counter 1049 holds the number 000. Then, when the compare pulse 1061 appears, the flip-flop is reset and the squarewave falls to its lower or 0 level. Under these conditions, the squarewave represented at 1062 has a constant period of 1/500 second, and a 50 percent duty cycle, i.e., it is "on" for an interval $a$ which is equal to the interval $b$ during which it is "off". The dc. or average value of the squarewave represented at 1062 is indicated by the dashed line 1064.

The right portion of FIG. 36 illustrates operation under changed circumstances, i.e., with the assumption that the number SSC is 750. Thus, compare pulses 1061a appear three-quarters of the way through each count sweep, and therefore the squarewave represented at 1062a still has a period T equal to 1/500 second, but its "on" intervals $a$ are three times as long as its "off" intervals $b$. Thus, it may be said that the duty cycle has a 75 percent value, and the dc. or average of that squarewave voltage is a higher voltage indicated at 1064a.

In order to convert the squarewave on line 1054 (FIG. 35) into a dc. voltage proportional to the duty cycle (and thus proportional to the number SSC), and which is of positive or negative polarity depending upon whether the table 1002 is to be driven in a clockwise or counterclockwise direction, the squarewave is applied to inputs of two AND gates 1065 and 1066. These gates respectively receive as their second inputs the output lines labeled DIRCW and DIRCCW from the DIR flip-flop 1038 in FIG. 34. The outputs from these two respective gates are supplied to the control inputs of selectively enabled constant current generators 1067, 1068 supplied from positive and negative voltages sources and commonly connected in series with a load resistor 1069. The voltage drop across that resistor is thus a squarewave of variable duty cycle having "off" levels of zero volts and "on" levels of a predetermined magnitude which is of positive or negative polarity depending upon whether the signal DIRCW or the signal DIRCCW is at a 1 level. A bi-directional Zener diode 1070 keeps the "on" voltage level clamped to a predetermined magnitude, e.g., ±12 volts. This controllably polarized squarewave appearing across the load resistor 1069 is passed through an R-C filter 1074 and applied across a potentiometer 1075 having an adjustable wiper 1076. The filtered dc. voltage is proportional to the average value of the variable duty cycle squarewave and it thus varies in magnitude (and may be either positive or negative in polarity) in proportion to changes in the value of the number SSC.

The dc. speed command voltage Ec appearing on the wiper 1076 is supplied as one input to a summing amplifier 1078 coupled as its output to energize the dc. spindle motor SM. A tachometer 1079 driven by that motor creates an actual-speed voltage which is fed back negatively to the other input of the amplifier 1078, so that the motor SM is energized with a voltage proportional to the error or difference between the commanded speed (as orginally represented by the numerical value SSC) and the actual speed. The gain of the amplifier is preferably very high, and the wiper 1076 may be adjusted to make the steady state motor speed in r.p.m. substantially equal to any steady state value of the number SSC signaled at the output of the register 1044.

Referring again to FIG. 36, if the dc. speed command voltage Ec (here represented by the curve 1080) is assumed merely as an example to be five volts when the number SSC is 500 and the squarewave duty cycle is 50 percent, the motor SM will drive the table at a speed of 500 r.p.m., as represented by the speed curve 1081. If the number SSC is abruptly changed to 750 at the time instant $t_1$, however, then the squarewave duty cycle will change to 75 percent (see 1062a), and the voltage Ec will promptly rise from 5 volts to 7.5 volts. The energization voltage applied to the motor will thus abruptly increase, but due to the inevitable maximum torque exertable by the motor, and the inertia of the massive table 1002 plus a heavy workpiece 1006 mounted thereon, the speed of the table will rise rather slowly, as depicted by the speed curve at 1081a. Thus, a considerable time delay TD may occur between the instant that the commanded table speed number SSC (and the dc. command voltage Ec) greatly increases or decreases, and the instant that the table reaches an actual speed corresponding to the new SSC numerical value.

In the operation of the modified director as thus far described, all of the sequences and results set forth previously with reference to Tables I, II, III and IV take place. Table IA is to be taken as supplementing Table I, however, and during time column x500 in every iteration period ΔT the operational steps represented in Table IA are carried out to make the table or spindle operate at the directly programmed r.p.m. (in response to an S word) or at a variable r.p.m. such that the programmed constant cutting speed is automatically maintained (in response to a C word).

Referring to Table IA, the sequences set out for time steps x540 to x590 are performed during each of the successive iteration periods ΔT, but they are effective only if the system is in the CSFM mode (and the signal CA thus exists); otherwise, the sequences at time steps x591 and x592 are effective (because the signal $\overline{CA}$ exists).

In the CSFM mode it is necessary to drive the spindle or table at a speed (in r.p.m.) which is equal to 1.91·SFM/r, as explained above by Equations (1) and (2), and even though the radial distance of the cutter from the center of the workpiece is continuously changing at a rate of ΔX per ΔT, as explained above. To do this, the Answer Register is cleared on time step x540 and the number SCA is read in (observe that PGA 1031 in FIG. 32 causes this function). On step x541 the number SCA is again read in and thus added to itself, so that the Answer Register holds 2 SCA. On time step x542, the number in the Answer Register is shifted to the left one decimal place (as indicated by the symbol "SL1" shown in Table IA), a subtract control signal sx is supplied to the computer 53, and the number SCA read in again. The Answer Register now holds a number which is equal to (20 SCA–SCA) or 19 SCA. This latter number on time step x543 is shifted left one place to become 190 SC and the number SCA is again additively read in from the register 1024 in FIG. 32 to produce the sum 191 SCA. On time step x543 the number in the Answer Register is shifted two places to the right and thus becomes 1.91 SCA. This is tantamount to 1.91 SFM, since the number SCA represents the programmed surface feet per minute.

On time step x546, an enable divide signal ed is supplied to the computer 53 while the Answer Register is holding the number 1.91 SCA as a numerator; and then on time step x547, the number XCP is read in from the register R6 in FIG. 9g, providing that the signal $\overline{POS}$ exists and the director is not in a positioning traverse mode. The number XCP which is read in as a denominator represents the radial distance r (see FIG. 28) which the cutter will reach during the current time period ΔT which is being measured off, as explained more fully above. The dimensional unit of the number XCP is inches. As shown in FIG. 28, the origin for the X axis coordinate numbers is taken for the lathe 1001 as being the workpiece center, i.e., the vertical axis of rotation 1003 of the table 1002. Therefore, by reading in the number XCP on time step x547 (as indicated in Table IA), a denominator is brought into the computer which represents the then-existing value of the changing radial position of the cutter.

During time steps x547 through x589, the computer performs a division sub-routine, the division operation being terminated by a control signal cd supplied to the computer on time step x589, after which there appears in the Answer Register the quotient which is equal to 1.91 SCA/XCP, that is, a number which is equal to 1.91 SFM/r. It will be recalled that in the constant cutting speed mode, the number held at SCA in the register 1024 (FIG. 32) is the programmed value for the constant cutting velocity expressed in surface feet per minute. The quotient represents the instantaneous value of the speed in r.p.m. at which the table should be moving in order to keep the cutting speed at the programmed value. This, on time step x590 (Table IA) the necessary r.p.m. number is written into the speed servo command register 1044 where it becomes a new value for the number SSC. The apparatus of FIG. 35 will thus energize the motor SM to make the table speed become equal to the new value of the number SSC.

From the foregoing, it will be seen that once during each iteration period ΔT —and as the radial position XCP of the cutter dynamically changes— a newly computed value for the number SSC is transferred into the register 1044 (FIG. 35) on time step x590, if the signal CA exists to designate that the system is operating in a CSFM mode.

On the other hand, if the system is not operating in a CSFM mode because the number SCA held in the register 1024 of FIG. F originated as a part of an S word, the signal CA will be 0 and the signal $\overline{CA}$ will be a 1, as made plain by FIG. 33. Therefore, as shown in Table IA the "writing" of a computed r.p.m. number into the SSC register does not take place on step x590. But, on step x591 the Answer Register is cleared, the number SCA is read into the computer, and on step x592 that same number is written as a new value into the SSC register of FIG. 1 where, as previously explained, it directly determines the table speed.

The system and operational steps as thus far described for controlling the rotational speed of a spindle or table, so as to produce either direct speed control or variable speed control for CSFM operation, is a part of the prior art. It has a serious disadvantage, however, in that when the cutter is moved from a position spaced greatly from the workpiece and at a rapid rate to a location where a CSFM cutting operation is to begin, the table will not have accelerated to a speed sufficient to produce the programmed value of constant cutting speed as the actual metal cutting function begins. Therefore, during the initial portions of a path segment during which work material is to be removed, the cutting speed will be below that which has been programmed, and this may produce a non-uniform or marred surface finish on the workpiece. If a dwell time is programmed after the cutter has closely approached the workpiece in order to give the table adequate time to come up to the required speed, the time is essentially wasted, and the efficiency of machine tool usage is degraded.

In accordance with the present invention, provision is made to cause the table speed control apparatus, and method steps carried out by its operation, to function as if the cutter were already at the end point of a rapid traverse positioning path segment —and when that path segment of motion is initiated. In this way, for a given programmed cutting speed, the table undergoes greater acceleration during that interval of time when the cutter is rapidly approaching the workpiece in the positioning mode, so that by the time the cutter reaches the end of the positioning segment, and is to begin a contouring cut in the CSFM mode, the table has reached the desired and necessary rotational speed to produce the programmed value of surface cutting speed.

As noted briefly above, the present modified numerical control system has the facility for automatically moving the controlled element or cutter at a rapid traverse rate which results in the long or fast axis having its maximum or limit velocity when a "positioning mode" block of command data containing a G00 code is being actively executed. This is possible because positioning with rapid traverse rates will be programmed (i.e., a G00 code will be used) under circumstances when the cutter is to be free of contact with the workpiece and it is desired to minimize the elapsed time in moving the cutter from a starting location to a designated end point coordinate position.

As indicated in Column x000 of Table IA (which supplements Table I) a resultant or path velocity is computed and signaled during each period ΔT which will cause the long or fast axis to move at its maximum velocity. When a block of data on the punched tape contains a G00 code (and thus the signal POS exists when that block is in active storage for execution), any programmed feed rate then held in the register FA will be ignored, and instead a traverse rate will automatically be put into effect. Deceleration prior to the end of any positioning path segment will automatically be created by the sequences previously described in detail. With one axis servo motor operating at its maximum speed, the traverse velocity along the path will be effected by the angle of a path segment extending from the starting point coordinates to the end point coordinates. To determine the path traverse velocity as a numerical value, the PGA's of the present system are supplemented (in a manner made physically clear by Table IA) so as to produce the operations designated in Column x000 of Table IA.

Referring to time step x054 in Table IA, the computer 53 is enabled for division by a signal ed and simultaneously the number D (the resultant of the axis components I and J as shown in FIG. 5) is read from register 47 (FIG. 9o) into the computer as a numerator. Thereafter, on step x055 the number I or J is read in as a denominator if the signal FAX or $\overline{FAX}$ respectively exists, and the division sequences within the computer proceed until step x080 when a "clear divide" signal cd is supplied. Thus, at the end of step x080 the accumulator holds the quotient D/I or D/J depending upon whether the X or Y axis is the fast axis. Although the input numbers D and I or J for this dividing operation are stored in and read from registers 47 and R16, R17 in decimal form, the computer 53 may be conditioned in a manner familiar to those skilled in the art to accept two decimal form numbers signaled in BCD format and to produce a numerical quotient in the same format. It will therefore be understood that if the fast axis is X or Y (because I is larger than J or vice versa), the number held in the accumulator at the end of step x080 represents either D/I or D/J, these being respectively equal to $1/\cos\theta$ or $1/\sin\theta$, as made plain by FIG. 5. That quotient is always equal to or greater than 1.0.

On time step x081, the number representing $1/\cos\theta$ or $1/\sin\theta$ (depending upon whether the fast axis is X or Y) is present in the Answer Register when an emx" signal is supplied to the computer 53 to initiate a multiplication sequence.

Every machine tool, or more accurately, its servos for moving the controlled element or cutter along the individual axes, will have upper limits or maximums for the individual axis velocities. These limits are established by the choice of the servo motors and the mechanical drive gears or lead screws. Merely as a specific example, it may be assumed that the maximum axis velocity $V_{am}$ along either the X or Y axis is 127 inches/min. for the lathe 1001 here described. If it is desired in the positioning mode of operation always to operate the fast axis velocity at the maximum value $V_{am}$ in order to minimize positioning time, then the resultant path velocity (which will here be called FT, representing a path traverse feed rate) will be $V_{am} \times 1/\cos\theta$ or $V_{am} \times 1/\sin\theta$. When $V_{am}$ is, for example, 127 inches/min. these expressions reduce to the simplified form:

$$FT = 127 \times 1/\cos\theta \text{ if } FAX = 1 \text{ or}$$

$$FT = 127 \times 1/\sin\theta \text{ if } \overline{FAX} = 1$$

Thus, at step x082 in Table IA, the assumed maximum axis velocity number "127" is read into the computer 53 as a multiplier, and is multiplied times the quantity $1/\cos\theta$ or $1/\sin\theta$ previously held in the Answer Register. This multiplication proceeds through step x092 when a clear multiply signal cmx" is applied to the computer and the Answer Register holds the product FT. Then, on time step $x093$ this computed positioning traverse path velocity number FT is written into a scratch pad register SP4 for future use.

The scratch pad register SP4 has not been physically shown in the drawings for the present application. However, its organization will be understood to be essentially similar to that shown for registers SP1, SP2 and SP3; and the organization of the PGA's associated with READ and WRITE gates for the register SP4 will be readily understood by those skilled in the art from the program steps which are set out in Tables IA and IIA. The path velocity for traversing in a positioning mode is always stored in the register SP4, but it will only be used when the block of command data containing a positioning code G00 is being actively executed, and therefore when the signal POS exists.

More specifically, the number FT will be used in lieu of any other programmed feed rate when the POS signal exists and the system is in a positioning mode. During the early or late stages of any segment execution in a positioning mode, automatic next block acceleration and automatic this block deceleration will be performed as may be required, with the actual path velocity being progressively changed as described in detail above. But still further, the traverse path feed rate FT which is stored in the register SP4 will be utilized only if the POS signal exists during Mode 1 when a new feed rate for the data block in active storage is first used. Table IIA sets out two specific modifications in Table II. Particularly, Table II on step 1095 contains the legend "$cx$, R/FA". As indicated in Table IIA, that operation on time step 1095 is modified to conform to the shorthand designations $cx$, R/FA ? $\overline{POS}$, R/SP4 ? POS. This means simply that when it is being determined whether or not "this block deceleration" is required to reach the commanded path feed rate for the next succeeding block in buffer storage (and whether the flip-flop ANR should be set), the currently existing path feed rate number FA is read into the computer if the system is in a contouring mode, i.e., if the $\overline{POS}$ signal exists. But on the other hand, if the system is operating in a traverse positioning mode, then the path traverse velocity number FT is instead read from the register SP4 because the signal POS exists.

Similarly, time step 1297 in Table II contains the legend "CAR, R/FA ? $\overline{TAD}$". As indicated in Table IIA, this is modified and supplemented to include the operational steps designated in shorthand terms by CAR, R/FA ? $\overline{TAD}$ · $\overline{POS}$, R/SP4 ? $\overline{TAD}$ · POS. This means simply that when the system is in normal operation, i.e., not executing "this block deceleration" and $\overline{TAD} = 0$, then the programmed path feed rate will be read from the register FA and subsequently used as the number PVC if the $\overline{POS}$ signal exists and the system is in a normal contouring mode of operation. On the other hand, if the POS signal exists and the system is in a traverse positioning mode, the traverse number FT will be read from the register SP4 instead. In summary, the system will use the programmed active feed rate from the register FA when it is functioning in a contouring mode; but on the other hand, it will use an automatically computed path traverse rate FT (stored in the register SP4) whenever it is operating in a positioning mode.

Let it be assumed now that the cutter 1007 is initially disposed at an X axis position $XCEP_1$ (see FIG. 28) lying at a relatively large radial distance $X_1$ from the X axis origin and the center of the workpiece 1006. If a one block $B_n$ of program data calls for the cutter to be moved inwardly to a point adjacent the edge of the workpiece (prior to starting an actual cutting path segment) and thus to a coordinate position $XCEP_2$, that block of program data may contain a G00 code in order that the cutter may move at a traverse path velocity (with or without simultaneous motion along the Y axis), thereby to reduce the elapsed time. The X axis component for such a positioning path segment would be I, as labeled in FIG. 28. But if it is desired that next block $B^l_1$ and the next path segment, following the point $XCEP_2$ and leading to point $XCEP_3$, produce cutting in a CSFM mode, then it is desirable that the table be rotating at the speed required for CSFM operation by the time the cutter reaches the point $XCEP_2$. If merely the CSFM mode is put into effect by a programmed C word during traverse execution of the block $B_n$ of data, then as the cutter moves progressively through the X axis distance I (passing through position labeled $X_2$), the number SSC will simply smoothly and progressively increase but at a relatively rapid rate. The voltage Ec and the motor-energizing voltage (FIG. 35) will progressively increase rather rapidly but due to the inertia of the load being driven by the motor SM, the table speed will not be able to keep up, and when the cutter arrives at point $XCEP_2$, the speed will at that instant be considerably less than $1.91\ SCA/XCEP_2$. Thus, if a contouring path segment with actual cutting of metal is executed immediately after the cutter has traversed to the position $XCEP_2$, the table will be rotating at a speed lower than that required to give the programmed surface cutting speed. In order to eliminate this difficulty, provision is here made to command a rotational speed which is equal to that required when the cutter reaches $XCEP_2$ as soon as the cutter begins traversing from the starting point $XCEP_1$.

Referring again to Column $x500$ of Table IA, it will be recalled that after time step $x544$, the Answer Register holds the number 1.91 SCA, and if the number SCA is the numerical value of a C word designating the CSFM mode of operation, the Answer Register holds a value equal to 1.91 SFM. Thereafter, on step $x545$, an "enable divide" signal $ed$ is supplied to the computer, and a numerator value is read in on step $x546$. In the normal contouring mode of operation, when the signal $\overline{POS}$ exists, the radius coordinate XCP is read in as a numerator, and in the example of FIG. 28, the value of XCP would be approximately equal to XCEP, at the start of the motion segment I. However, when the system is in a traverse positioning mode and the signal POS exists because the program data block in active storage contained a G00 code, then the instantaneous radial position XCP of the cutter is not read into the computer, but instead the end point position XCEP or radial distance to be occupied by the cutter at the end of the positioning segment motion is read in as a numerator. This is the significance of the legend "R/XCEP ? POS" at time step $x546$. In the example of FIG. 28, the value $XCEP_2$ will be used as a denominator in the very first period $\Delta T$ when the execution of the segment I begins. This end point along the X axis for the positioning segment is readily available in the system since it is represented by the number XCEP stored in the register R14 (FIG. 9$i$), and from Table 1A it will be understood that the PGA R14r is to be taken as containing the legend "$x546$ · POS".

Therefore, when the system of the present invention is in a normal contouring mode, the division operation depicted at steps $x545$ through $x589$ in Table IA results in the following computation:

$$\text{Commanded r.p.m.} = 1.91 \, SFM/XCP \quad (3)$$

But on the other hand, when the system of the present invention is in a positioning mode, and the controlled element is being moved at a rapid traverse rate while free of contact with the workpiece, then the operations depicted in Column $x500$ of Table IA result in the computation of a commanded r.p.m. value according to the expression:

$$\text{Commanded r.p.m.} = 1.91 \, SFM/XCEP \quad (4)$$

The commanded r.p.m. number so computed appears in the Answer Register on step $x589$ and it is written into the SSC storage register 1044 during time step $x590$, providing the signal CA exists to indicate that the system is in the CSFM mode.

Of course, the macromove target position number XCP is changed during each iteration period $\Delta T$ by the macromove amount $\Delta X$ as described above, and thus both the number XCP and the commanded r.p.m. number written into the register SSC change according to Equation (3) during each period $\Delta T$ when the system is operating in a non-positioning or contouring mode. This means simply that as the cutter moves progressively inwardly toward the workpiece and its radial distance from the workpiece center decreases with each passing period $\Delta T$, the command voltage Ec in FIG. 35 gradually and smoothly increases, and the table motor SM is called upon to run at a progressively higher speed. Yet, the table motor for a given voltage applied thereto cannot accelerate its massive load at a high rate, and if the cutter were moving inwardly toward the workpiece center at a traverse velocity, the table speed would lag behind that called for by the SSC number.

With the method and apparatus of the present invention, however, when the cutter starts from the position $XCEP_1$ shown in FIG. 28 and begins moving in a traverse positioning mode toward the end point location $XCEP_2$ (at which its radial position will be $X_3$ and numerically equal to $XCEP_2$), the coordinate number or radial distance value $XCEP_2$, is used immediately in Equation (4). It is used in Equation (4) during every period $\Delta T$ required to execute the segment I in the POS mode. Since the numerical value of $XCEP_2$ is greatly less than $XCEP_1$ (or any of the intermediate values XCP as the cutter moves to the left from $XCEP_1$), the number SSC is increased immediately by a large amount, and the speed command voltage Ec jumps by a large amount. Therefore, the difference or error voltage applied to the motor SM jumps to a final high value much earlier than it can reach that value by progressive step increases, and the spindle motor is caused to accelerate the table 1002 and a workpiece 1006 at a higher rate than would otherwise result. Thus, by the time the cutter has traversed to the end point $XCEP_2$, the table has had an opportunity to accelerate to that relatively high speed which is called for in order to produce the programmed constant cutting speed represented by the number then held in the register SCA. Viewed in another way, when the commanded r.p.m. number SSC is abruptly increased at the start of a positioning mode segment, the time delay TD shown in FIG. 36 as required for the acceleration of the table is expended during the time the segment is being executed, so the table is up to the required speed when the end point of the segment is reached.

In summary, the present invention makes it possible for a turning machine controlled by a numerical control director to operate in a CSFM mode immediately after a cutter has been rapidly moved from a remote location to a point in proximity with the workpiece, and with the commanded constant cutting speed being immediately achieved. Without this provision, the commanded constant cutting speed will not be achieved until some time after the actual metal cutting begins, and as a consequence the surface finish and the accuracy of the workpiece surface might be adversely affected.

The drawings for the present application which are constituted by those incorporated by reference from Case A plus those which accompany this case as supplements, do not explicitly show by every detail of the PGA's necessary to carry out the steps shown in Tables IA, IIA and IVA. While most of the PGA's and the appropriate legends therein are so illustrated, some have been omitted because it will readily be understood by those familiar with the present disclosure just how those PGA's may be constructed to carry out the operational steps represented by the legends of the tables. For example, in step $x544$ of Table IA, the legend SR3 simply means the number in the Answer Register is to be shifted two places to the right; and this control signal may readily be supplied to the computer 53 by the PGA CC15 in FIG. 9c if the latter is constructed to include the diodes necessary to produce an output signal on each and every time step $x544$. Therefore, the tables which form the latter portion of the present specification supply a complete instruction to one skilled in the art as to how the apparatus is to be constructed.

Table IVA supplements Table IV and illustrates how certain number-representing signals are transferred from buffer to active storage and how certain control signals are removed or created during Mode 3 transfer operations after the complete execution of a block of data in active storage. All of the operations shown in Table IV are carried out during Mode 3, but in addition, on steps 3340 or 3840 (Table IVA), the buffer register number SC is read into the cleared Answer Register, and then written during step 3341 or 3841 into the SCA active register 1024 where it becomes the number SCA. Moreover, on time step 3342 or 3842 the flip-flop DIR is enabled or cleared if the M03 or M04 signal then respectively exists. This means that so long as the M03 signal exists, the flip-flop DIR will remain set and the signal DIRCW will remain in existence. But if at any time the signal M03 is replaced by the signal M04 (due to reading of the latter from a block of the program tape), the signal DIRCW is replaced by the signal DIRCCW, and the direction in which the motor SM turns the table 1002 will be changed. Similarly, on step 3342 or 3842 as shown in Table IVA, the CA flip-flop is enabled or cleared if the signal NDC or NDS then respectively exists. This means that the system is put into its CSFM mode by the setting of the flip-flop CA immediately after any C word is read from any block of data on the programmed tape. Conversely, the system is converted from its CSFM mode to its direct r.p.m. mode of table speed control in response to the reading of any S word from a block of data on the programmed tape.

Finally, during program steps 3343 or 3843 (Table IVA) the new data S and new data C flip-flops 1020 and 1021 are cleared by the PGA 1022 (FIG. 29) and neither will be set until a new S or C word is next read from the programmed tape. Thus, once the flip-flop CA 1034 in FIG. 33 has been placed in a set or reset condition to produce the CA or $\overline{CA}$ signal, it will remain in that condition until a different one of the two words S and C is read from a block of data on the punched tape.

In all other respects, the control system operates in a manner previously described, including automatic "this block" deceleration and "next block" acceleration.

There follow as the terminal pages of this specification the Tables IA, IIA and IVA which have been referred to above.

TABLE IA.—STEPS PERFORMED IN ALL MODES (SUPPLEMENT TO TABLE I)

| Time step | X000 | X100 to X400 | X500 | X600 to X900 |
|---|---|---|---|---|
| 00 | ESP→ | → | → | → |
| 01 to 39 | | | | |
| 40 | | | CAR, R/SCA | |
| 41 | | | R/SCA | |
| 42 | | | SL1, sx, R/SCA | |
| 43 | | | SL1, R/SCA | |
| 44 | | | SR2 | |
| 45 | | | ed | |
| 46 | | | R/XCP ? $\overline{POS}$ R/XCEP ? POS | |
| 47 to 53 | | | | |
| 54 | | ed, R/D | | |
| 55 | | R/I ? FAX R/J ? $\overline{FAX}$ | | |
| 56 to 79 | | DIVIDE | DIVIDE | |
| 80 | | cd | | |
| 81 | | emx″ | | |
| 82 | | R/127 | | |
| | | MULTIPLY | | |
| 89 | | | cd | |
| 90 | | | W/SCC ? CA | |
| 91 | | | CAR, R/SCA | |
| 92 | | cmx″ | W/SSC ? $\overline{CA}$ | |
| 93 | | W/SP4 | | |
| 94 to 99 | | | | |

TABLE IIA

STEPS PECULIAR TO MODE 1
(MODIFICATIONS TO TABLE II)

| Step 1095 | Step 1297 |
|---|---|
| cx, R/FA ? $\overline{POS}$ R/SP4 ? POS | CAR, R/FA ? $\overline{TAD}$ $\overline{POS}$ R/SP4 ? $\overline{TAD}$ POS R/.003 ? DTZ TAD R/FB ? ANR TAD |

TABLE IVA.—STEPS PECULIAR TO MODE 3 (SUPPLEMENT TO TABLE IV)

| | 3300 | | 3800 |
|---|---|---|---|
| ≈ | ≈ | ≈ | ≈ |
| 40 | CAR, R/SC | → | |
| 41 | W/SCA, CAR | → | |
| 42 | EDIR ? M03 CDIR ? M04 ECA ? NDC CCA ? NDS | → | |
| 43 | CNDS CNDC | → | |
| ≈ | ≈ | ≈ | ≈ |

I claim:

1. In a machine tool control system having means to drive a spindle at a rotational speed which varies inversely in proportion to the radial distance of a cutter from the spindle axis as the cutter moves to different positions along a path disposed radially of the spindle axis, and wherein the cutter is moved through successive segments to successively commanded end point positions measured from the spindle axis along that path, the improved method which comprises
   a. signaling successively each successive commanded end point position, and
   b. when the cutter is to be moved in a positioning mode free of contact with any workpiece on the spindle, energizing said spindle drive means to call for a rotational speed which is inversely proportional to the signaled commanded end point position.

2. The method set forth in claim 1 wherein said spindle is driven by a velocity servo responsive to a commanded speed signal and having response time delays due to inertia, and further characterized in that said step (b) includes supplying to the servo a commanded speed signal which is inversely proportional to the signaled commanded end point position, whereby the spindle may accelerate or decelerate to the commanded speed during the time required for the cutter to reach the commanded end point position.

3. In the controlling of a machine tool having a rotatable spindle and a cutter-carrying member movable along a path radial of the spindle axis and to positions measured from the spindle axis, the method comprising a. producing first or second mode signals ($\overline{POS}$ or POS), b. driving said member toward a signaled end point position on the path whenever its actual position is not in agreement therewith, c. producing a speed command signal which (i) varies dynamically and inversely with changes in the actual position of said member when said first mode signal exits or (ii) is inversely proportional to the signaled end point position when said second mode signal exits, and d. utilizing said speed command signal to correspondingly control the speed at which said spindle is rotationally driven.

4. In the controlling of a machine tool having a rotatable spindle and a member translatable along a path disposed radially of the spindle, the method comprising a. producing first or second mode signals ($\overline{POS}$ or POS) designating rapid traverse or feeding modes of translation for the member, b. producing successive sets of end point signals (XCEP) representing successive final positions to which said member is to be moved along said path, c. producing position signals (XCP) which dynamically change to substantially represent the actual position of said member along the path, d. moving said member toward the signaled final position to bring its actual position into agreement with the signaled final position, said moving being (i) at a feed rate when said first mode signal exits or (ii) at a traverse rate when said second mode signal exits, e. driving said spindle at a changing rotational speed inversely proportional to the value (XCP) represented by said changing position signals when said first mode signal exits, and f. driving said spindle at a rotational speed inversely proportional to the value (XCEP) represented by said end point signals when said second mode signal exits.

5. In a machine tool control system having means to rotate a spindle at a variable controlled speed and means to translate a cutter member along an X axis disposed radially of the spindle axis, th method which comprises the steps of a. producing first electrical signals digitally representing the X axis segment end point coordinate (XCEP) to which the member is to be moved with respect to the spindle axis, b. producing second electrical signals digitally representing a dynamically changing commanded X axis coordinate (XCP) to be occupied by the member, c. changing said second signals either (i) at a rapid traverse rate or (ii) at a feed rate so that commanded coordinate progressively changes to approach the end point coordinate, d. utilizing said second signals to control said translating means to move the member along the X axis to keep its actual X axis coordinate position dynamically in agreement with said commanded coordinate, e. producing a changeable speed command signal and energizing said rotating means therewith to drive said spindle at a speed proportional thereto, f. utilizing said first signals to make said speed command signal inversely proportional to the end point coordinate (XCEP) while and when said second signals are being changed at a rapid traverse rate, and g. utilizing said second signals to make said speed command signal change to be dynamically inversely proportional to the commanded X axis coordinate (XCP) while and when said second signals are being changed at a feed rate.

6. In a method of controlling a machine tool having a rotatable spindle adapted to carry a workpiece, and a cutter movable along a path radial of the spindle axis to different positions measured relative to such axis, said method comprising a. measuring off successive, equal time periods $\Delta T$, b. representing by first changeable digital signals successive programmed end point positions XCEP of successive path segments, c. representing by second changeable digital signals successive commanded positions XCP, d. changing said second signals to change the commanded position XCP by an amount $\Delta X$ during each period $\Delta T$, where $\Delta X$ is proporational to a desired velocity at which the cutter is to be moved, until XCP becomes equal to XCEP, and thereafter signaling a new value of XCEP, e. moving the cutter along the path to keep its actual position dynamically and substantially in agreement with the position XCP represented by said second signals, f. producing a speed command signal which varies in inverse proportion to the commanded position XCP represented by said second signals, and g. applying said speed command signal to a spindle driving servo to rotate the spindle at a speed proportional to that signal, the improvement which comprises i. omitting said step (f) when the cutter is to be radially positioned while free of contact with the workpiece, and instead, ii. producing said speed command signal such that it is inversely proportional to the programmed end point position XCEP represented by said first signals.

7. In a machine tool control system having means to drive a spindle at a rotational speed which varies inversely in proportion to the radial distance of a cutter from the spindle axis as the cutter moves to different positions along a path disposed radially of the spindle axis, and means for moving the cutter through successive segments to successively commanded program end point positions measured from the spindle axis as an origin along the path, the improvement which comprises, in combination a. means for signaling successively each successive commanded program end point position, and b. means for energizing said spindle drive means to call for a speed which is inversely proportional to signaled commanded end point position whenever the cutter is moving in a positioning mode free of contact with any workpiece on the spindle.

8. In a system for controlling a machine tool having a rotatable spindle and a cutter-carrying member movable to different positions measured from and lying on a path radial to the spindle axis, said system including a. means for normally driving said spindle at a rotational speed inversely proportional to the radial position of said member as the latter moves along said path,
b. means for successively signaling end-point positions to be reached at the ends of successive segments to be moved by the member along the path, and
c. means for moving the member at programmed feed rates from one end-point to the next, the improvement which comprises, in combination
d. means for disabling said means (a) under predetermined conditions indicative that the cutter is free of contact with any workpiece on the spindle, and e. means operative simultaneously with said means (d) for driving the spindle at a rotational speed inversely proportional to the end point position signaled by said means (b), whereby the spindle will have a speed inversely proportional to actual radial displacement of the member when it reaches said end point position even though the spindle driving means is subject to response delays due to inertia.

9. In a machine tool control system having means to drive a spindle at a variable controlled rotational speed and means to translate a cutter member along an X axis disposed radially of the spindle axis, the combination comprising:

means for producing first electrical signals digitally representing the X axis segment end point coordinate (XCEP) to which the member is to be moved, with the spindle axis taken as the origin of the X axis,
means for producing second electrical signals digitally representing a dynamically changing commanded X axis coordinate (XCP) to be occupied by the member,
means responsive to a first mode signal ($\overline{POS}$) for changing said second signals such that the commanded coordinate (XCP) changes at a feed rate, means responsive to a second mode signal (POS) for changing said second signals such that the commanded coordinate (XCP) changes at a traverse rate,
means responsive to said second signals for controlling said translating means to move the member along the X axis and keep its actual coordinate position dynamically in agreement with the changing commanded coordinate (XCP),
means for producing a commanded speed signal and applying it to said drive means to cause the spindle to rotate at a speed proportional to that signal, means responsive to the combination of said first mode signal ($\overline{POS}$) and said second signals for controlling said producing means to make said commanded speed signal vary to be inversely proportional to the represented changing commanded coordinate (XCP), and means responsive to the combination of said second mode signal (POS) and said first signals for controlling said producing means to make said commanded speed signal inversely proportional to the represented end point coordinate (XCEP).

* * * * *

UNITED STATES PATENT OFFICE
CERTIFICATE OF CORRECTION

Patent No. 3,840,791  Dated  Oct. 8, 1974

Inventor(s) William H. Mack

It is certified that error appears in the above-identified patent and that said Letters Patent are hereby corrected as shown below:

Column 2, line 40, "invention" is changed to --specification--.

Column 4, line 62, "29" is changed to --C--. Same line, "C" is changed is changed to --29--.

Column 8, line 57, "voltages" is changed to --voltage--.

Column 10, line 53, "This" is changed to --Thus--.

Column 14, line 12, "$B^1_1$" is changed to --$B_{n+1}$--.

Column 17, line 60, "W/SCC" is changed to --W/SSC--.

Column 19, line 45, "th" is changed to --the--.

Signed and Sealed this

Twenty-seventh Day of July 1976

[SEAL]

Attest:

RUTH C. MASON  
*Attesting Officer*

C. MARSHALL DANN  
*Commissioner of Patents and Trademarks*